United States Patent
Van Der Vegt

(10) Patent No.: US 9,237,309 B2
(45) Date of Patent: Jan. 12, 2016

(54) CONDITIONAL ACCESS SYSTEM AND SMARTCARD FOR USE IN CONDITIONAL ACCESS SYSTEM

(75) Inventor: Arjen Van Der Vegt, Utrecht (NL)

(73) Assignee: Irdeto B.V., Hoofddorp (NL)

( * ) Notice: Subject to any disclaimer, the term of this patent is extended or adjusted under 35 U.S.C. 154(b) by 1246 days.

(21) Appl. No.: 12/383,432

(22) Filed: Mar. 24, 2009

(65) Prior Publication Data

US 2009/0254937 A1 Oct. 8, 2009

(30) Foreign Application Priority Data

Apr. 4, 2008 (EP) ..................................... 08103372

(51) Int. Cl.
| | |
|---|---|
| *H04N 7/167* | (2011.01) |
| *H04N 7/16* | (2011.01) |
| *G06F 21/34* | (2013.01) |
| *H04L 29/06* | (2006.01) |
| *H04N 21/418* | (2011.01) |
| *H04N 21/4623* | (2011.01) |
| *H04N 21/475* | (2011.01) |
| *H04N 21/488* | (2011.01) |

(52) U.S. Cl.
CPC ............... *H04N 7/163* (2013.01); *G06F 21/34* (2013.01); *H04L 63/10* (2013.01); *H04N 21/4181* (2013.01); *H04N 21/4623* (2013.01); *H04N 21/4753* (2013.01); *H04N 21/4882* (2013.01); *H04L 2463/101* (2013.01)

(58) Field of Classification Search
CPC .................................................... H04L 9/0822
USPC .................................................. 380/201, 227
See application file for complete search history.

(56) References Cited

U.S. PATENT DOCUMENTS

| | | | |
|---|---|---|---|
| 7,269,795 B2* | 9/2007 | Whittenberger | ............... 715/764 |
| 7,584,164 B2* | 9/2009 | McCaffrey | ....................... 706/52 |
| 8,045,709 B2* | 10/2011 | Park et al. | ..................... 380/239 |
| 2002/0080160 A1* | 6/2002 | Devito et al. | .................. 345/716 |

(Continued)

FOREIGN PATENT DOCUMENTS

| | | |
|---|---|---|
| EP | 1608123 A1 | 12/2005 |
| EP | 1699239 A2 | 9/2006 |

(Continued)

OTHER PUBLICATIONS

Alec Woo; Transmission Control Scheme for Media Access in Sensor Networks; Year: 2001; ACM; pp. 1-15.*

(Continued)

*Primary Examiner* — Monjour Rahim
(74) *Attorney, Agent, or Firm* — Marc S. Kaufman; Amardeep S. Grewal; Reed Smith LLP

(57) ABSTRACT

Embodiments of the invention include a conditional access system comprising a terminal and a smartcard, wherein the terminal comprises a user interface for interaction with an end-user, comprising an output for displaying first user interaction data and an input for generating second user interaction data in response to the first user interaction data; and a descrambler configured for descrambling scrambled content, and wherein the smartcard is configured for generating the first user interaction data and allowing, in dependence of the second user interaction data received from the user interface, the descrambler to descramble the scrambled content.

19 Claims, 3 Drawing Sheets

(56) References Cited

U.S. PATENT DOCUMENTS

| | | | |
|---|---|---|---|
| 2002/0129249 A1* | 9/2002 | Maillard et al. | 713/172 |
| 2003/0188164 A1* | 10/2003 | Okimoto et al. | 713/172 |
| 2004/0120529 A1* | 6/2004 | Zhang et al. | 380/278 |
| 2007/0121940 A1* | 5/2007 | Park et al. | 380/201 |
| 2007/0127887 A1* | 6/2007 | Yap et al. | 386/95 |
| 2008/0096535 A1* | 4/2008 | Kim | 455/414.1 |
| 2008/0263680 A1* | 10/2008 | Bertin | 726/30 |

FOREIGN PATENT DOCUMENTS

| | | |
|---|---|---|
| EP | 1772986 A2 | 4/2007 |
| JP | 2001119357 A | 4/2001 |
| JP | 2005020724 A | 1/2005 |
| JP | 2007036367 A | 2/2007 |
| WO | 9720431 | 6/1997 |
| WO | WO-2007/125223 A2 | 11/2007 |

OTHER PUBLICATIONS

"European Application Serial No. 08103372.2, Communication and European Search Report mailed Oct. 24, 2008", 5 pgs.

"Oberthur Technologies and Irdeto Demonstrate Innovation in Mobile TV", *Irdeto—Press Release*, [online]. Retrieved from the Internet: <URL: http://www.irdeto.com/page.php?page_id=9&press_id=132>, (Feb. 10, 2008), 1 pg.

"Service and Content Protection for Mobile Broadcast Services [Draft Version 1.0]", OMA-TS-BCAST_SvcCntProtection-V1_0-20070504-D, © 2007 Open Mobile Alliance Ltd., (May 4, 2007), 196 pgs.

"Smartcard Web Server Enabler Architecture, Candidate Version 1.0", OMA-AD-Smartcard_Web_Server-V1_0-20070209-C, © 2007 Open Mobile Alliance Ltd., (Feb. 9, 2007), 17 pgs.

Hans, S., et al., "Conditional Access with Java Card™ and DReaM-CAS", *2008 Sun Labs Open House*, [online]. Retrieved from the Internet: <URL: http://research.sun.com/sunlabsday/docs.2008/Conditional-Access-with-Java-Card-and-DReaM-CAS.pdf>, (Apr. 10, 2008), 24 pgs.

Prasertsatid, N., et al., "Implementation Conditional Access System for Pay TV Based on Java Card", *Proceedings IEEE Region 10 Conference (TENCON 2004)*, vol. B (2004), 399-402.

Urien, P., "Internet card, a smart card as a true Internet node", *Computer Communications*, 23(17), (2000), 1655-1666.

Meng Zheng et al., "A Common Smart-card based Conditional Access System for Digital Set-Top Boxes" IEEE Transactions on Consumer Electronics, vol. 50, No. 2 May 2004.

Qiang Xie et al., "A Smart-Card-based Conditional Access Subsystem Separation Scheme for Digital TV Broadcasting", IEEE Transactions on Consumer Electronics, vol. 51, No. 3, Aug. 2005.

* cited by examiner

CONDITIONAL ACCESS SYSTEM AND SMARTCARD FOR USE IN CONDITIONAL ACCESS SYSTEM

CLAIM OF PRIORITY

The present patent application claims the priority benefit of the filing date of European Application (EPO) No. 08103372.2 filed Apr. 4, 2008, the entire content of which is incorporated herein by reference in its entirety.

FIELD OF THE INVENTION

The present invention relates to a conditional access system, a smartcard for use in a conditional access system and a conditional access client for use in a terminal.

BACKGROUND

Conditional access systems are generally used to provide conditional access to services like premium content. The content is scrambled and a smartcard is used to conditionally allow a terminal to descramble the scrambled content. The smart-card allows descrambling of the content by transmitting control words (CW) needed for descrambling to the terminal.

The smartcard is generally a separate card which is to be inserted into the terminal before operation. Alternatively the smartcard can be a surface mounted device (SMD) integrated into the terminal.

The terminal is e.g. a set-top box, PVR or a mobile phone. A user interface comprising output means such as a display and possibly input means such as a key-board can be connected to the terminal. A television e.g. can be connected to the set-top box for displaying the descrambled content. Alternatively the user interface is integrated into the terminal. A mobile phone e.g. is equipped with a display and keypad or keyboard and can be used to display descrambled content on the display and receive user input through the keypad/keyboard.

The terminal has a receiver for receiving data comprising scrambled content, entitlement management messages (EMM) and encrypted entitlement control messages (ECM). The EMM is a data unit that provides general information about the subscriber and the status of the subscription. The ECM is a data unit that contains the CW needed for decrypting the scrambled content.

A filter in the terminal filters the EMM and ECM from the data and a conditional access client (CA client) in the terminal receives the EMM and ECM from the filter. The CA client processes the EMM and ECM and, depending on the content of the EMM and ECM, transmits a first status code to the smartcard.

The smartcard analyses the first status code and responds to the CA client with a second status code if descrambling of the content cannot be allowed based on the first status code. Alternatively the smartcard decrypts the ECM to obtain the CW and transmits the CW to the CA client if descrambling of the content is allowed based on the first status code.

In known conditional access systems, user interaction functionality is implemented in the CA client. If the EMM or second status code indicates that user interaction is required, e.g. because a PIN-code, confirmation, payment or content selection is required before allowing descrambling of the content, the CA client generates a message which is transmitted to the output means of the user interface. Through the input means of the user interface the end-user responds to the message and the response is processed by the CA client. Depending on the response a third status code is transmitted to the smartcard and the smartcard responds as described for the first status code and second status code.

In modern terminals parts of the CA client are implemented as firmware stored on a field re-programmable ROM or flash memory. The firmware is upgradable by downloading new firmware. The new firmware is e.g. downloaded from an external server using a web browser in the terminal, using over-the-air (OTA) provisioning techniques in case of mobile phones, or provided to the terminal through e.g. a Bluetooth interface.

In older terminals, for which the installed-base is much higher, CA client functionality is not upgradable as it is implemented in ROM.

Parts of the functionality of the smartcard can be implemented as firmware stored in a memory. This firmware can be upgraded by providing a new firmware to the CA client transmitted in EMMs, or using over-the-air (OTA) provisioning techniques in case of mobile phones, and starting an upgrade procedure in the CA client to provide the new firmware to the smartcard. Alternatively the smartcard can be replaced by a new smartcard.

A drawback of known conditional access systems is that conditional access functionality is split between CA client and smartcard. Consequently adding functionality to an existing conditional access system disadvantageously requires both the CA client and the smartcard to be upgraded. User interaction functionality in the CA client needs to be upgraded by the end-user or by the service provider in control of the terminal, while the smartcard needs to be upgraded by the smartcard provider. When using older terminals the CA client cannot be upgraded. Adding functionality to new conditional access systems disadvantageously requires close cooperation between the terminal vendor and the smartcard vendor to align CA client functionality and possibly user interface aspects with smartcard functionality.

Another drawback results from conditional access functionality being generally conditional access system specific. This requires terminal vendors to manufacture conditional access system specific terminals.

SUMMARY OF THE INVENTION

It is an object of the invention to provide an improved conditional access system.

According to an aspect of the invention a conditional access system is provided comprising a terminal and a smartcard. The terminal comprises a user interface for interaction with an end-user. The user interface comprises an output means for displaying first user interaction data. The user interface further comprises an input means for generating second user interaction data. The terminal further comprises a descrambler configured for descrambling scrambled content. The smartcard is configured for generating the first user interaction data. The smartcard is further configured for allowing, in dependence of the second user interaction data received from the user interface, the descrambler to descramble the scrambled content.

According to an aspect of the invention a smartcard is provided for use in a conditional access system comprising a terminal and the smartcard. The smartcard is configured for generating first user interaction data for display on the terminal. The smartcard is further configured for allowing, in dependence of second user interaction data received from the terminal in response to the first user interaction data, the terminal to descramble scrambled content.

Thus the conditional access system advantageously implements user interaction functionality in the smartcard. This enables e.g. addition of functionality to existing conditional access systems by upgrading the smartcard, without requiring an upgrade of the terminal. This also enables the terminal to be generic, while the smartcard is conditional access system specific.

In an embodiment a detachable smartcard can be used. The detachable smartcard is e.g. a credit card sized smartcard that is inserted into a card slot of the terminal, a SIM card that is inserted into a SIM slot of the terminal or a USIM card that is inserted into a USIM slot of the terminal.

In an embodiment the user interface can be external to the terminal.

The embodiments of claims 2 and 9 advantageously enable a terminal to comprise a conditional access client with minimal functionality and a smartcard with user interaction functionality. The smartcard advantageously uses a generic interface for communication with the conditional access client, enabling e.g. upgrades to the conditional access system without requiring specifying new interfaces between smartcard and conditional access client.

The embodiments of claims 3 and 10 advantageously enable the smartcard to process entitlement management messages.

The embodiments of claims 4 and 11 advantageously enable the generic interface to be based on generic standardized technology as used for communication between a web server and a web client. Moreover, using a markup language, such as e.g. HTML, WML, XHTML or XML, enables the use of a generic user interface and relative easy addition of functionality to the conditional access system.

The embodiments of claims 5 and 12 advantageously enable a data object that is not available on the smartcard to be displayed on the output means of the user interface. The remote server is located outside the terminal and outside the smartcard and is e.g. a web server on the internet.

The embodiments of claims 6 and 13 advantageously enable addition of functionality to the conditional access system.

The embodiments of claims 7 and 14 advantageously enable the smartcard to generate specific first user interaction data and processing the second user interaction data in response thereof, before allowing the scrambled content to be descrambled.

According to an aspect of the invention a terminal is provided comprising a conditional access client. The conditional access client is configured for forwarding an entitlement control message and/or an entitlement management message to a smartcard. The conditional access client is further configured for forwarding first user interaction data from the smartcard to a user interface of the terminal. The conditional access client is further configured for forwarding second user interaction data from the user interface to the smartcard. The conditional access client is further configured for forwarding a control word from the smartcard to a descrambler of the terminal.

Thus the terminal can advantageously be used in a conditional access system that implements user interaction functionality in the smartcard. This enables e.g. addition of functionality to existing conditional access systems by upgrading the smartcard, without requiring an upgrade of the conditional access client. This also enables the conditional access client to be generic, while the smartcard is conditional access system specific.

The invention enables a method for use in a smartcard having one or more of the above mentioned features and characteristics.

The invention enables a computer program element which, when being executed by a processor, is adapted to carry out the method for use in a smart card having one or more of the above mentioned features. This advantageously enables the smart card to be implemented partly or as a whole in software.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
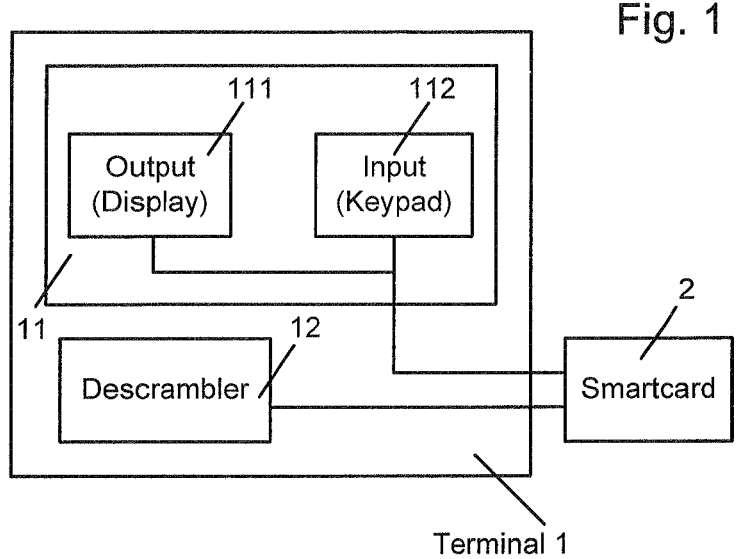
FIG. 1 shows a conditional access system of an exemplary embodiment of the invention.

A terminal 1 used for accessing scrambled content uses a smartcard to enable descrambling the scrambled content. The smartcard 1 allows descrambling of the scrambled content by transmitting control words needed for descrambling to a descrambler 12 in the terminal 1. Before allowing the descrambling, the smartcard 2 verifies if the end-user is authorised to access the content. If user interaction is needed for authorisation, then the smartcard 2 generates first user interaction data for requesting the required authorisation data and transmits the first user interaction data to the terminal 1 where it is displayed to the end-user. The end-user responds to the authorisation request, which response is received as second user interaction data in the smartcard 2. After processing the response a further user interaction may be required before descrambling is allowed.

The interface for user interaction between the smartcard 2 and the terminal 1 is generic, meaning that the interface is independent of the content transported on the interface. This enables functionality to be added to an existing conditional access system without having to redefine the interface.

User interaction functionality is handled by the smartcard 2. This enables functionality to be added to an existing conditional access system by upgrading or replacing the smartcard 2, without having to modify the terminal 1.

In the following exemplary embodiments terminal 1 is a mobile phone. It will be understood that terminal 1 can be any other suitable terminal for conditional access to scrambled content, such as e.g. a set-top box or PVR. Terminals that do not have a user interface 11 can use an external user interface that is connected to the terminal. A set-top box can e.g. be attached to a television for displaying the first user interaction data. For user input a remote control can e.g. be used with the television or an external keyboard can e.g. be attached to the set-top box.

FIG. 1 shows a simplified architecture of a conditional access system. The conditional access system comprises a mobile phone 1 and a smartcard 2. Mobile phone 1 comprises a descrambler 12, which is connected to the smartcard 2 for receiving control words. The mobile phone 2 further comprises a user interface 11 having an output means 111 in the form of a display module and an input means 112 in the form of a keypad. User interface 11 communicates with smartcard 2 using a generic interface.

Smartcard 2 has user interaction functionality enabling the smartcard 2 to generate first user interaction data and receive and process second user interaction data. The first user interaction data is transmitted to the display module 111. Keypad 112 generates the second user interaction data.

Display module 111 is used for displaying the first user interaction data. The user interaction data comprises e.g. a request for a pin-code. Keypad 112 is used for generating second user interaction data by receiving the pin-code from the keypad, which is e.g. typed-in by the end-user. The second user interaction data is transmitted to the smartcard 2 where it is processed. If the pin-code is correct, smartcard 2 allows descrambler 12 to descramble the scrambled content.

Other examples of first user interaction data are a confirmation request, a payment instruction and a parental control instruction.

The descrambled content can be displayed using e.g. the display module. Sound that is part of the content can be made audible through a loudspeaker of the mobile phone. It is possible to attach an external device to the mobile phone for displaying the descrambled content. How the descrambled content can be made visible and audible is outside the scope of this invention and is therefore not shown in the figures.

Figure 2:
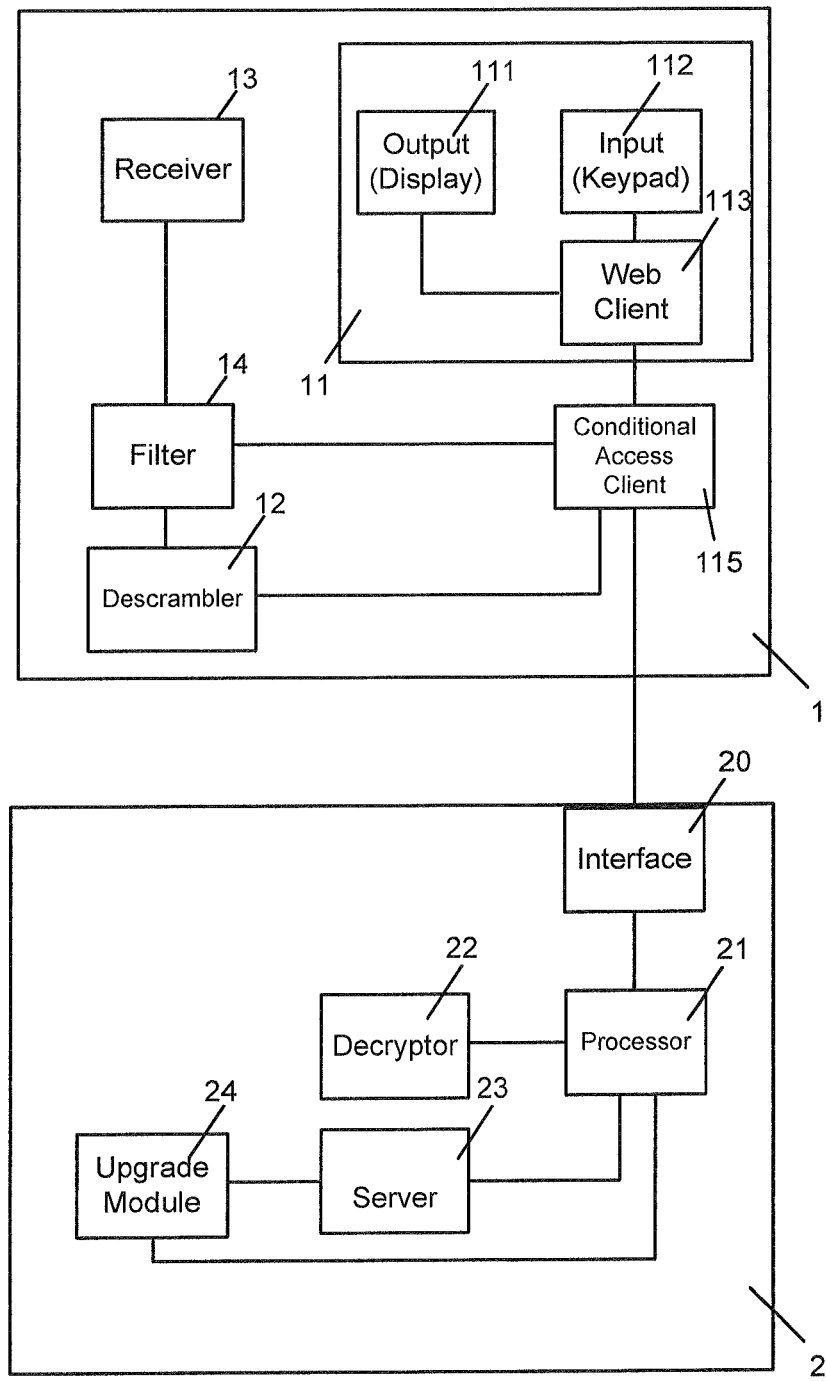
FIG. 2 shows a conditional access system of an exemplary embodiment of the invention.

In FIG. 2 a more detailed architecture of a conditional access system is shown. In addition to what is described for FIG. 1, in FIG. 2 the mobile terminal 1 comprises a receiver 13 for receiving data from an external source. A filter 14 is connected to receiver 13, descrambler 12 and to a conditional access client 15. The conditional access client 15 is connected to the user interface 11, filter 14 and descrambler 12, and can communicate with the smartcard 2. User interface 11 comprises a web client 113. Web client 113 is connected to the display module 111 for displaying a web page and to the keypad 112 for receiving end-user input. It is possible that web client 113 is not part of the user interface 11. Web client 113 can e.g. be a separate module residing in-between conditional access client 15 and user interface 11.

Smartcard 2 comprises a generic interface 20 for communication with the conditional access client 15. The generic interface 20 is connected to a processor 21. Processor 21 is connected to a decryptor 22, a server 23 and optionally an upgrade module 24. The server 23 is e.g. a web server or a SIM-toolkit application. Server 23 is optionally connected to the upgrade module 24.

Figure 3:
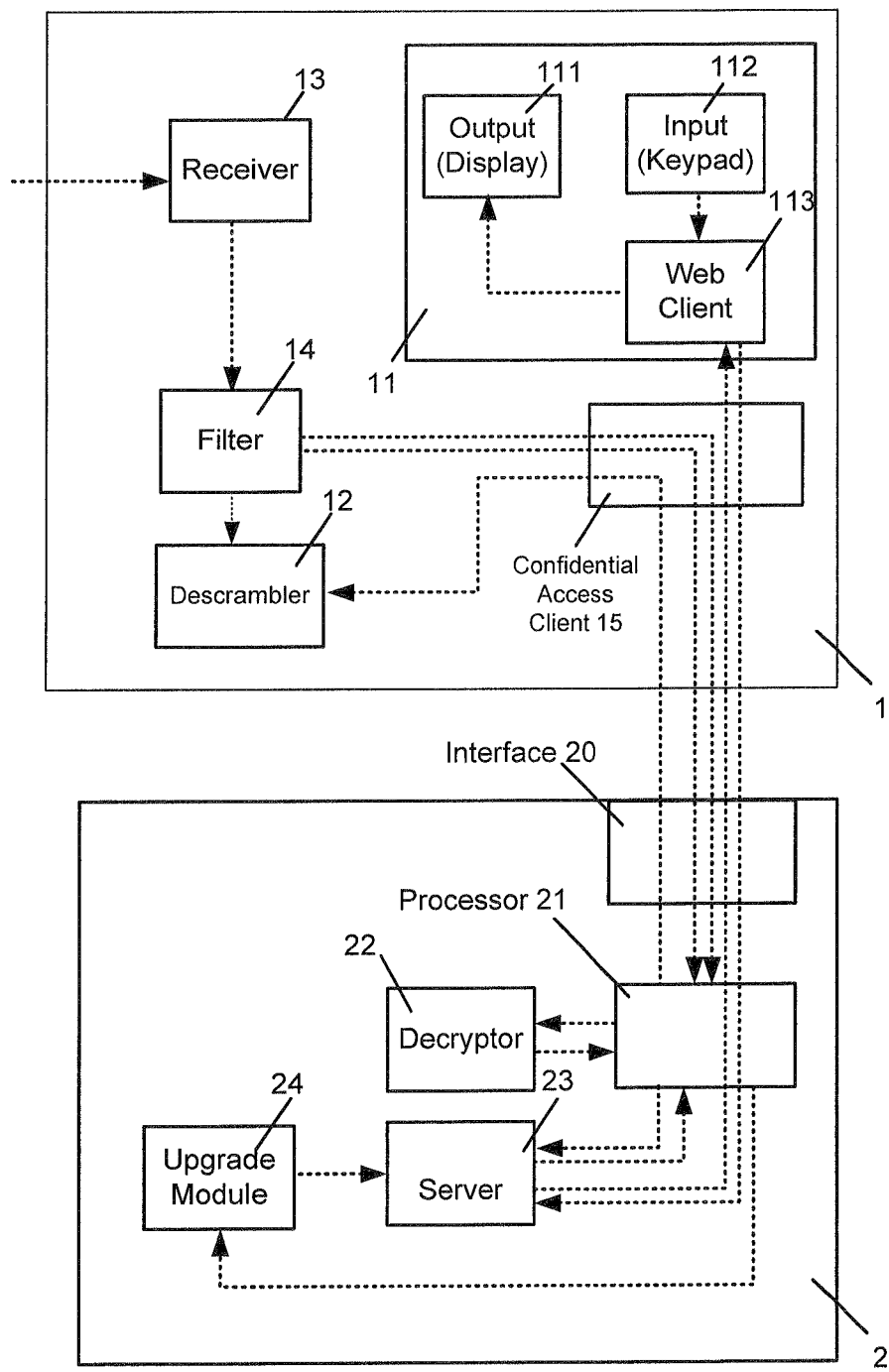
FIG. 3 shows a data-flow in a conditional access system of an exemplary embodiment of the invention.

FIG. 3 shows how data flows through the conditional access system of FIG. 2. A dashed arrow indicates a flow of data and is not to be confused with a physical or logical connection. The data-flows shown between generic interface 20 and conditional access client 15 can e.g. be transported through one physical connection (e.g. an electrical connection between smartcard 2 and terminal 1) and two logical connections (e.g. one logical connection for transporting control words, ECMs and EMMs, and one logical connection for transporting user interaction data).

Receiver 13 receives data from an external source. The data is e.g. received in a DVB-H signal from a digital television provider. The data comprises scrambled content, one or more ECMs and one or more EMMs. It is possible that the scrambled content, ECMs and/or EMMs are not received in the same time frame. Receiver 13 transmits the data to filter 14

Filter 14 filters ECMs and EMMs from the data and transmits the ECMs and EMMs to the conditional access client 15. Conditional access client 15 receives the ECMs and EMMs and forwards the ECMs and EMMs to the generic interface Generic interface 20 forwards the ECMs and EMMs to processor 21, where the ECMs and EMMs are processed. The processing result of processing the ECM and/or EMM can be that user interaction is required before allowing the terminal to descramble the scrambled content. A server instruction is then generated and transmitted to web server 23. Optionally upgrade data found in the EMMs is transmitted to the upgrade module 24.

Web server 23 receives the server instruction and generates a web page in response. It is possible that instead of being triggered by the server instruction, the web server 23 receives a web page request from web client 113. The web page is transmitted from the web server 23 to the generic interface 20, possibly through processor 21. Generic interface 20 transmits the web page to conditional access client 15. Conditional access client 15 forward the web page to the web client 113 and the web page is displayed on display module 111.

Through keypad 112 the web client 113 receives a response, which is transmitted to the conditional access client 15. Conditional access client 15 forwards the response to the generic interface 20. Generic interface 20 transmits the response to the web server 23, possibly through processor 21. The web server 23 processes the response from the web client 113 and transmits a server response to processor 21. The server response indicates e.g. whether or not the response from the web client 113 satisfies authorisation criteria, e.g. whether or not a requested pin-code is correctly received. It is possible that the server response comprises a representation of the response from the web client 113 and that the processor 21 processes the server response to determine whether or not the authorisation criteria are met.

Decryptor 22 decrypts the ECMs to obtain the control words and transmits the control words to the processor 21. Depending on the server response, descrambler 12 is allowed to descramble the scrambled content. If allowed, generic interface 20 transmits the control words to the conditional access client 15. Conditional access client 15 receives the control words and forwards the control words to the descrambler 12.

Descrambler 12 receives the scrambled content from the filter. Descrambler 12 receives the control words from the smartcard 2 and is thereby allowed to descramble the scrambled content and uses the code words to descramble the scrambled content.

For upgrading the smartcard, the upgrade data is received by the upgrade module 24. Upgrade module 24 retrieves upgrade data from the processor 21 and uses the upgrade data to upgrade an upgradable server in the web server. The upgradable server is part or whole of the web server and possibly the content part of the web server where sources for the first user data are stored.

The web pages generated by the web server 23 are typically formatted in a markup language. Any markup language may be used, such as e.g. HTML, WML, XHTML or XML. The web page that is generated by the web server 23 uses e.g. HTML forms to request input from the end-user. The response from the web client 113 is also formatted in the markup language.

The web page generated by the web server 23 can have a link to an object located on an external web server. The link is formatted conforming to the markup language syntax and enables e.g. downloading of an image by the web client 113 from the external web server.

It is possible that a more a complex authorisation procedure is required before descrambling of the scrambled content can be allowed, e.g. in case payment is required for pay-per-view content. The web page generated by the web server 23 can then e.g. comprise a link to an object on a payment server external to the terminal 1 and smartcard 2. After making the payment, the result of the payment is transmitted in the second user interaction data to the web server 23. The smartcard 2 may store the result as a ticket in a memory of the smartcard 2 not shown in the figures.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from appropriate consideration of the drawings, the disclosure, and the appended claims.

What is claimed is:

1. A conditional access system comprising:
    a terminal and a smartcard, wherein the terminal comprises:
        a user interface for interaction with an end-user, comprising an output for displaying first user interaction data for authentication and an input for generating second user interaction data in response to the first user interaction data via a user interaction; and
        a descrambler configured for descrambling scrambled content,
    and wherein the smartcard is configured for:
        in response to receiving an encrypted key from the terminal, generating the first user interaction data for authentication and transmitting the first user interaction data to the terminal;
        receiving, from the terminal, the second user interaction data in response to the first user interaction data for authentication; and
        determining whether the second user interaction data received from the user interface is acceptable, and in response to the determination, allowing the descrambler to descramble the scrambled content based on the encrypted key.

2. The conditional access system according to claim 1, wherein the terminal further includes:
    a receiver configured for receiving data comprising the scrambled content and an encrypted entitlement control message comprising a control word;
    a filter configured for filtering the entitlement control message from the data; and
    a conditional access client configured for forwarding the entitlement control message to the smartcard, forwarding the first user interaction data from the smartcard to the user interface, forwarding the second user interaction data from the user interface to the smartcard, and forwarding the control word from the smartcard to the descrambler,
    wherein the descrambler is configured for descrambling the scrambled content using the control word,
    and wherein the smartcard comprises:
        a generic interface configured for communication with the conditional access client;
        a processor configured for processing the entitlement control message to obtain a server instruction and transmitting the server instruction to a server, the processor further configured for processing a server response to obtain a processing result, and allowing, in dependence of the processing result, the descrambler to descramble the scrambled content;
        a decryptor configured for decrypting the entitlement control message to obtain the control word; and
    the server configured for generating the first user interaction data in response to the server instruction, processing the second user interaction data to obtain the server response, and transmitting the server response to the processor.

3. The conditional access system according to claim 1, wherein the terminal
    further includes:
    a receiver configured for receiving data comprising the scrambled content and an entitlement management message;
    a filter configured for filtering the entitlement management message from the data; and
    a conditional access client configured for forwarding the entitlement management message to the smartcard, forwarding the first user interaction data from the smartcard to the user interface and forwarding the second user interaction data from the user interface to the smartcard,
    and wherein the smartcard comprises:
        a generic interface configured for communication with the conditional access client;
        a processor configured for processing the entitlement management message to obtain a server instruction and transmitting the server instruction to a server, the processor further configured for processing a server response to obtain a processing result, and allowing, in dependence of the processing result, the descrambler to descramble the scrambled content; and
        the server configured for generating the first user interaction data in response to the server instruction, processing the second user interaction data to obtain the server response, and transmitting the server response to the processor.

4. The conditional access system according to claim 2, wherein the server is a web server, wherein the user interface comprises a web client, and wherein a markup language is used to format the first user interaction data and the second user interaction data.

5. The conditional access system according to claim 4, wherein the first user interaction data comprises a reference to a data object stored on a remote server, and wherein the web client is configured for receiving the data object through the receiver.

6. The conditional access system according to claim 3, wherein the server comprises an upgradable server, and wherein the smartcard further comprises an upgrade module configured for upgrading the upgradable server with upgrade data received in one or more entitlement management messages.

7. The conditional access system according to claim 1, wherein the first user interaction data comprises one or more of the following information elements:
    a pin-code request, for which the second user interaction data transmitted in response thereof is processed by the smartcard before allowing the scrambled content to be descrambled;
    a confirmation request, for which the second user interaction data transmitted in response thereof is processed by the smartcard before allowing the scrambled content to be descrambled;
    a payment instruction, for which the second user interaction data transmitted in response thereof is processed by the smartcard before allowing scrambled pay-per-view content or scrambled pay-per-time content to be descrambled;
    a parental control instruction, for which the second user interaction data transmitted in response thereof is processed by the smartcard before allowing scrambled adult content to be descrambled; and a service guide, for which the second user interaction data transmitted in response thereof is processed by the smartcard before allowing selected scrambled content to be descrambled.

8. A smartcard for use in a conditional access system,
a memory; and
a processor coupling to the memory and configured for:
in response to receiving an encrypted key from a terminal, generating first user interaction data for authentication and display on the terminal and transmitting the first user interaction data to the terminal,
receiving, from the terminal, second user interaction data generated in the terminal via a user interaction in response to the first user interaction data for authentication, and
determining whether the second user interaction data received from the user interface is acceptable, and in response to the determination, allowing the terminal to descramble scrambled content, comprising:
decrypting the encrypted key, and
transmitting to the terminal the decrypted key for descrambling the scrambled content, in dependence of the second user interaction data.

9. The smartcard according to claim 8, wherein the smartcard comprises:
a generic interface configured for communication with a conditional access client in the terminal;
the processor configured for processing an entitlement control message received from the conditional access client to obtain a server instruction and transmitting the server instruction to a server, the processor further configured for processing a server response to obtain an processing result, and allowing, in dependence of the processing result, transmission of a control word to the conditional access client;
a decryptor configured for decrypting the entitlement control message to obtain the control word; and
the server configured for generating the first user interaction data in response to the server instruction, processing the second user interaction data to obtain the server response, and transmitting the server response to the processor.

10. The smartcard according to claim 8, wherein the smartcard comprises:
a generic interface configured for communication with a conditional access client in the terminal;
the processor configured for processing an entitlement management message received from the conditional access client to obtain a server instruction and transmitting the server instruction to a server, the processor further configured for processing a server response to obtain an processing result, and allowing, in dependence of the processing result, the terminal to descramble scrambled content; and
the server configured for generating the first user interaction data in response to the server instruction, processing the second user interaction data to obtain the server response, and transmitting the server response to the processor.

11. The smartcard according to claim 9, wherein the server is a web server and wherein a markup language is used to format the first user interaction data.

12. The smartcard according to claim 11, wherein the first user interaction data comprises a reference to a data object stored on a remote server.

13. The smartcard according to claim 10, wherein the server comprises an upgradable server, and wherein the smartcard further comprises an upgrade module configured for upgrading the upgradable server with upgrade data received in one or more entitlement management messages.

14. The smartcard according to claim 8, wherein the first user interaction data comprises one or more of the following information elements:
a pin-code request, for which the second user interaction data transmitted in response thereof is processed by the smartcard before allowing the scrambled content to be descrambled;
a confirmation request, for which the second user interaction data transmitted in response thereof is processed by the smartcard before allowing the scrambled content to be descrambled;
a payment instruction, for which the second user interaction data transmitted in response thereof is processed by the smartcard before allowing scrambled pay-per-view content or scrambled pay-per-time content to be descrambled;
a parental control instruction, for which the second user interaction data transmitted in response thereof is processed by the smartcard before allowing scrambled adult content to be descrambled; and
a service guide, for which the second user interaction data transmitted in response thereof is processed by the smartcard before allowing selected scrambled content to be descrambled.

15. A terminal comprising:
a conditional access client comprising:
a memory; and
a processor coupling to the memory and configured for:
forwarding at least one of an entitlement control message and an entitlement management message to a smartcard,
in response to transmitting the at least one of an entitlement control message and an entitlement management message, receiving first user interaction data from the smartcard for authentication,
in response to receiving the first user interaction data for authentication, generating second user interaction data via a user interaction and, forwarding second user interaction data from a user interface of the terminal to the smartcard, and
in response to transmitting the second user interaction data, receiving, from the smartcard, a key for descrambling scrambled content.

16. The smartcard according to claim 8, wherein the smartcard either inserted into the terminal or integrated into the terminal transmits the first user interaction data to the terminal, receives the second user interaction data from the terminal and transmits the decrypted key to the terminal.

17. The conditional access system according to claim 1, wherein the smartcard is configured for:
in response to receiving from the terminal the second user interaction data, determining whether the second user interaction data complies with authorization criteria; and
in response to determining whether the second user interaction data complies with authorization criteria, decrypting the encrypted key and transmitting to the terminal the decrypted key for descrambling the scrambled content.

18. A method for a conditional access system comprising:
in response to receiving an encrypted key from a terminal, a smartcard generating first user interaction data for authentication and transmitting the first user interaction data to the terminal;

in response to receiving from the terminal second user interaction data generated by a user of the terminal in response to the first user interaction data for authentication, the smartcard determining whether the second user interaction data complies with authorization criteria; and in response to determining whether the second user interaction data complies with authorization criteria, the smartcard decrypting the encrypted key and transmitting to the terminal the decrypted key for descrambling scrambled content.

19. A non-transitory computer readable storage medium storing one or more programs, the one or more programs comprising instructions, which when executed by a smartcard, cause the system to perform a method comprising:

in response to receiving an encrypted key from a terminal, generating first user interaction data for authentication and transmitting the first user interaction data to the terminal;

in response to receiving from the terminal second user interaction data generated via a user interaction in the terminal in response to the first user interaction data for authentication, determining whether the second user interaction data complies with authorization criteria; and in response to determining whether the second user interaction data complies with authorization criteria, decrypting the encrypted key and transmitting to the terminal the decrypted key for descrambling scrambled content.

* * * * *